United States Patent
Tsunoda et al.

(10) Patent No.: US 12,031,576 B2
(45) Date of Patent: Jul. 9, 2024

(54) MOTION GUIDE APPARATUS

(71) Applicant: THK CO., LTD., Tokyo (JP)

(72) Inventors: Takuma Tsunoda, Tokyo (JP); Kentaro Hikomoto, Tokyo (JP); Hiroyuki Kishi, Tokyo (JP)

(73) Assignee: THK CO., LTD., Tokyo (JP)

( * ) Notice: Subject to any disclaimer, the term of this patent is extended or adjusted under 35 U.S.C. 154(b) by 61 days.

(21) Appl. No.: 17/925,496

(22) PCT Filed: Mar. 23, 2021

(86) PCT No.: PCT/JP2021/011892
§ 371 (c)(1),
(2) Date: Nov. 15, 2022

(87) PCT Pub. No.: WO2021/235075
PCT Pub. Date: Nov. 25, 2021

(65) Prior Publication Data
US 2023/0184291 A1    Jun. 15, 2023

(30) Foreign Application Priority Data
May 20, 2020   (JP) .................................. 2020-087900

(51) Int. Cl.
*F16C 29/06*   (2006.01)
*F16C 19/50*   (2006.01)

(52) U.S. Cl.
CPC ...... *F16C 29/0609* (2013.01); *F16C 29/0611* (2013.01); *F16C 29/0654* (2013.01);
(Continued)

(58) Field of Classification Search
CPC ................. F16C 19/50; F16C 29/0609; F16C 29/0654; F16C 29/0657; F16C 29/0659;
(Continued)

(56) References Cited

U.S. PATENT DOCUMENTS

| 2006/0013517 | A1 | 1/2006 | Kato |
| 2017/0159711 | A1 | 6/2017 | Matsumoto |
| 2020/0332833 | A1 | 10/2020 | Kishi et al. |

FOREIGN PATENT DOCUMENTS

| DE | 10156339 A1 * | 5/2002 | .......... F16C 29/0609 |
| JP | 2004-068880 A | 3/2004 | |

(Continued)

OTHER PUBLICATIONS

International Search Report dated May 25, 2021, issued in counterpart International Application No. PCT/JP2021/011892.
(Continued)

*Primary Examiner* — Phillip A Johnson
(74) *Attorney, Agent, or Firm* — WHDA, LLP

(57) ABSTRACT

A motion guide apparatus is provided which can prevent a ball from contacting an edge of a ball rolling groove of a track member when the ball transfers from a rolling surface of the inner peripheral side of a turn-around path (an inner peripheral-side component) to the track member. The motion guide apparatus includes: a track member (2) including a ball rolling groove (2*a*); and a moving member assembled to the track member (2) in such a manner as to be movable relative to the track member (2). The moving member includes: a moving member body having a loaded ball rolling groove facing the ball rolling groove (2*a*), and a return path substantially parallel to the loaded ball rolling groove; and a lid member having a turn-around path. In cross section of the motion guide apparatus perpendicular to a length direction of the track member (2), letting the radius of curvature of the ball rolling groove (2*a*) be R, and letting the distance from a ball center (O) to a rolling surface (21) of the inner peripheral side of the turn-around path (an inner peripheral-side component (9*a*)) be r, R>r is set.

4 Claims, 9 Drawing Sheets

(52) U.S. Cl.
CPC .......... *F16C 19/50* (2013.01); *F16C 29/0695* (2013.01); *F16C 2240/40* (2013.01)

(58) Field of Classification Search
CPC .............. F16C 29/0661; F16C 29/0664; F16C 29/0695; F16C 2240/40
See application file for complete search history.

(56) References Cited

FOREIGN PATENT DOCUMENTS

| | | | |
|---|---|---|---|
| JP | 2016-014456 A | | 1/2016 |
| JP | 2019-044963 A | | 3/2019 |
| KR | 20200041887 A | * | 4/2020 |
| TW | 200613655 A | | 5/2006 |

OTHER PUBLICATIONS

Office Action dated Apr. 19, 2024, issued in counterpart TW application No. 110114629. (3 pages).

\* cited by examiner

MOTION GUIDE APPARATUS

TECHNICAL FIELD

The present invention relates to a motion guide apparatus that guides the motion of a movable body such as a table.

BACKGROUND ART

A motion guide apparatus is known which guides the motion (linear motion or curvilinear motion) of a movable body such as a table (refer to, for example, Patent Literature 1). The motion guide apparatus includes a track member, and a moving member that is assembled to the track member in such a manner as to be movable relative to the track member. The movable body such as a table is attached to the moving member. A plurality of balls is disposed between the track member and the moving member in such a manner as to be capable of rolling motion. The motion of the movable body is guided by use of the rolling motion of the balls, which enables guiding the movable body with high accuracy and high rigidity.

A ball rolling groove is formed in the track member. The moving member includes a moving member body and lid members. A loaded ball rolling groove facing the ball rolling groove, and a return path substantially parallel to the loaded ball rolling groove are formed on and in the moving member body. Turn-around paths connected to a loaded path between the ball rolling groove and the loaded ball rolling groove and to the return path are formed in each of the lid members. The each of lid members includes a lid body where the outer peripheral side of the turn-around path is formed, and an inner peripheral-side component where the inner peripheral side of the turn-around path is formed. The loaded path, the return path, and the turn-around paths configure a circulation path. The plurality of balls is arranged in the circulation path. When the moving member moves relative to the track member, the plurality of balls circulate in the circulation path.

CITATION LIST

Patent Literature

Patent Literature 1: JP 2004-68880 A

SUMMARY OF INVENTION

Technical Problem

However, the known motion guide apparatus has a structure where, when the balls transfer from a rolling surface of the inner peripheral side of the turn-around path (the inner peripheral-side component) to the track member, the balls contact an edge of the ball rolling groove of the track member. Hence, there is normally no problem, but when the motion guide apparatus is used at high speeds, high stress may be produced at a contact portion between the balls and the edge of the ball rolling groove to form an indentation in the contact portion.

The present invention has been made considering the above problem, and an object thereof is to provide a motion guide apparatus that can prevent a ball from contacting an edge of a ball rolling groove of a track member when the ball transfers from a rolling surface of the inner peripheral side of a turn-around path to the track member.

Solution to Problem

In order to solve the above problem, one aspect of the present invention is a motion guide apparatus including: a track member including a ball rolling groove; and a moving member assembled to the track member in such a manner as to be movable relative to the track member, the moving member including: a moving member body having a loaded ball rolling groove facing the ball rolling groove, and a return path substantially parallel to the loaded ball rolling groove; and a lid member having a turn-around path connected to a loaded path between the ball rolling groove and the loaded ball rolling groove and to the return path, the loaded path, the return path, and the turn-around path configuring a circulation path where a plurality of balls is arranged, in which in cross section of the motion guide apparatus perpendicular to a length direction of the track member, letting the radius of curvature of the ball rolling groove be R, and letting the distance from a ball center to a rolling surface of the inner peripheral side of the turn-around path be r, R>r is set.

Advantageous Effects of Invention

According to the present invention, the rolling surface is placed inward of an extension line of the ball rolling groove; therefore, it is possible to prevent the balls from contacting an edge of the ball rolling groove of the track member when the balls transfer from the rolling surface to the track member.

DESCRIPTION OF EMBODIMENTS

A motion guide apparatus of an embodiment of the present invention is described hereinafter on the basis of the accompanying drawings. However, the motion guide apparatus of the present invention can be embodied in various modes, and is not limited to the embodiment described in the description. The embodiment is provided with the intention of enabling those skilled in the art to fully understand the scope of the invention by fully disclosing the description.

Figure 1:
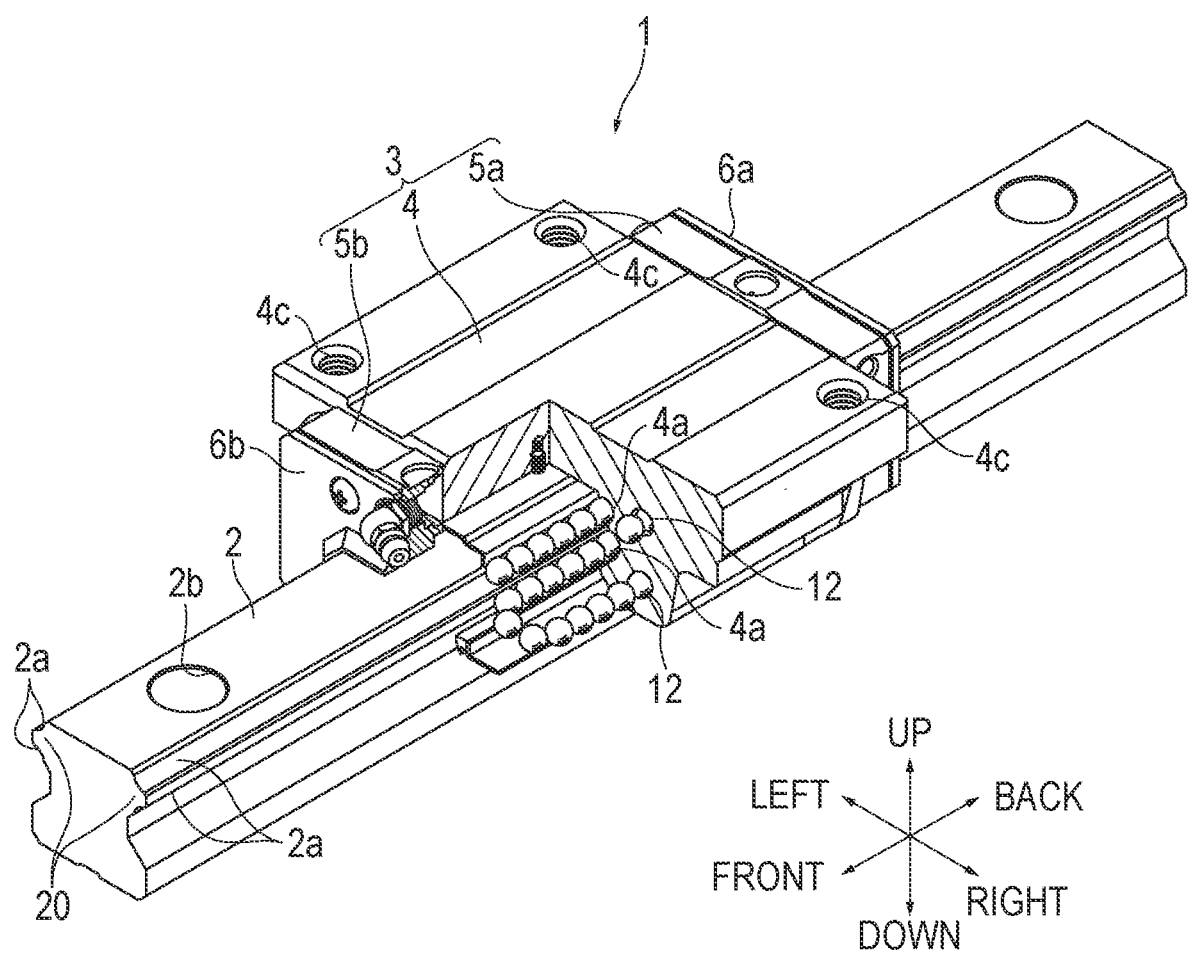
FIG. 1 is an external perspective view (including a partial cross-sectional view) of a motion guide apparatus of one embodiment of the present invention.

FIG. 1 illustrates an external perspective view (including a partial cross-sectional view) of a motion guide apparatus 1 of one embodiment of the present invention. For convenience of description, directions of when the motion guide apparatus 1 is placed on a horizontal plane and viewed from the front, that is, up and down, left and right, and front and back in FIG. 1 are used below to describe the configuration of the motion guide apparatus 1. Naturally, the placement of the motion guide apparatus 1 is not limited to the above.

As illustrated in FIG. 1, the motion guide apparatus 1 includes a rail 2 as a track member, and a block 3 as a moving member that is assembled to the rail 2 in such a manner as to be movable relative to the rail 2. The movement of the block 3 is relative to the rail 2. The block 3 may move, or the rail 2 may move.

The rail 2 extends in a straight line. A bolt through-hole 2b for attaching the rail 2 to a base is formed in an upper surface of the rail 2. Four ball rolling grooves 2a extending in a length direction of the rail 2 are formed on the left and right sides of the rail 2. In the embodiment, a pair of protruding portions 20 protruding to the left and right is formed on an upper part of the rail 2, and two ball rolling grooves 2a are formed above and below each of the protruding portions 20. The ball rolling grooves 2a have a circular arc or Gothic arch shape in cross section. The rail 2 may extend in a curved path. The number and placement of the ball rolling grooves 2a can be changed as appropriate in accordance with the use of the motion guide apparatus 1.

The block 3 has an inverted U shape in front view, and is assembled to the rail 2 in such a manner as to be astride the rail 2. The block 3 includes a block body 4 as a moving member body, and a pair of lid members 5a and 5b that are attached to both end surfaces of the block body 4 in the direction of movement. The block body 4 includes loaded ball rolling grooves 4a formed thereon, the loaded ball rolling grooves 4a facing the ball rolling grooves 2a in the rail 2, and return paths 12 formed therein, the return paths 12 being parallel to the loaded ball rolling grooves 4a. The loaded ball rolling grooves 4a have a circular arc or Gothic arch shape in cross section. A reference sign 4c denotes a screw hole for attaching a movable body such as a table to the block body 4. Reference signs 6a and 6b denote seal members.

Figure 2:
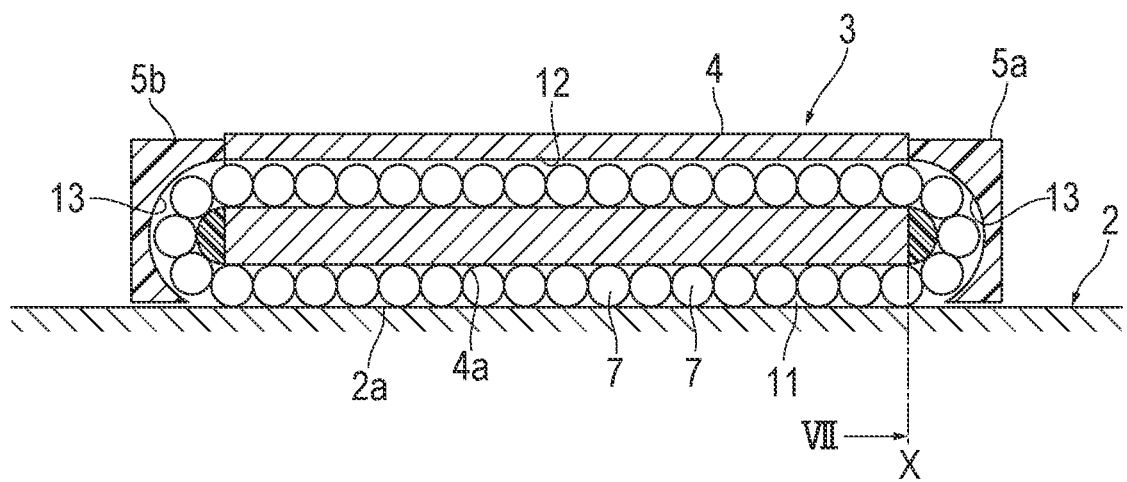
FIG. 2 is a cross-sectional view of a circulation path of the motion guide apparatus of the embodiment.

FIG. 2 illustrates a cross-sectional view of a circulation path. The circulation path includes a loaded path 11, the return path 12, and U-shaped turn-around paths 13 each connected to the loaded path 11 and the return path 12. A plurality of balls 7 is arranged in the circulation path. When the block 3 moves relative to the rail 2, the balls 7 circulate in the circulation path. The loaded path 11 is formed between the ball rolling groove 2a and the loaded ball rolling groove 4a. In the loaded path 11, the balls 7 are under load conditions, and is, for example, preloaded, and loaded by the movable body. The return path 12 is formed in the block body 4. The turn-around paths 13 are formed in the lid members 5a and 5b, respectively. The inner diameters of the return path 12 and the turn-around paths 13 are slightly greater than the diameter of the balls 7. The balls 7 are under no-load conditions in the return path 12 and the turn-around paths 13.

Figure 3:
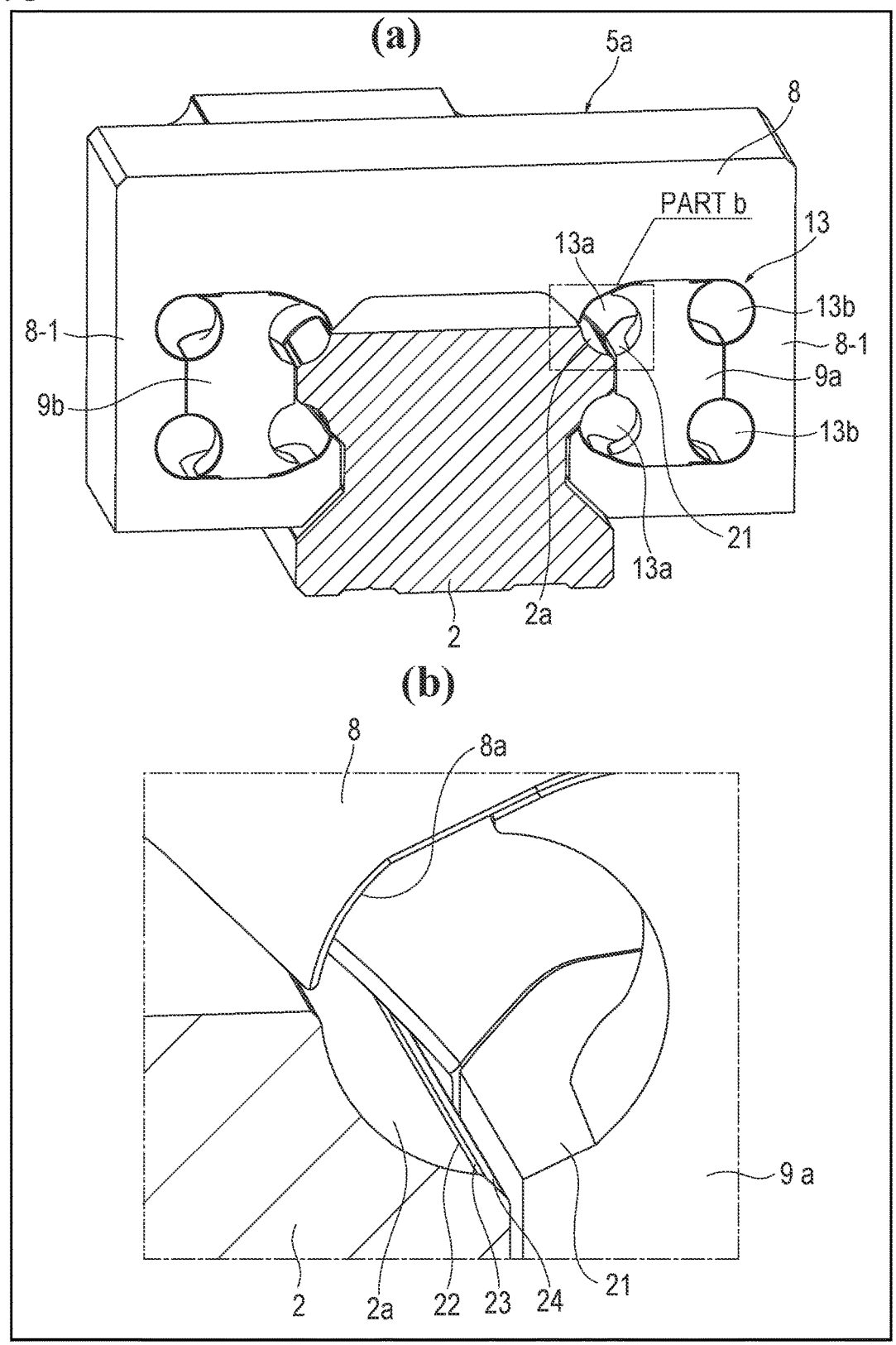
FIG. 3 is perspective views of a lid member of the motion guide apparatus of the embodiment (FIG. 3(a) is a perspective view of the lid member, and FIG. 3(b) is an enlarged view of a part b in FIG. 3(a)).
Figure 4:
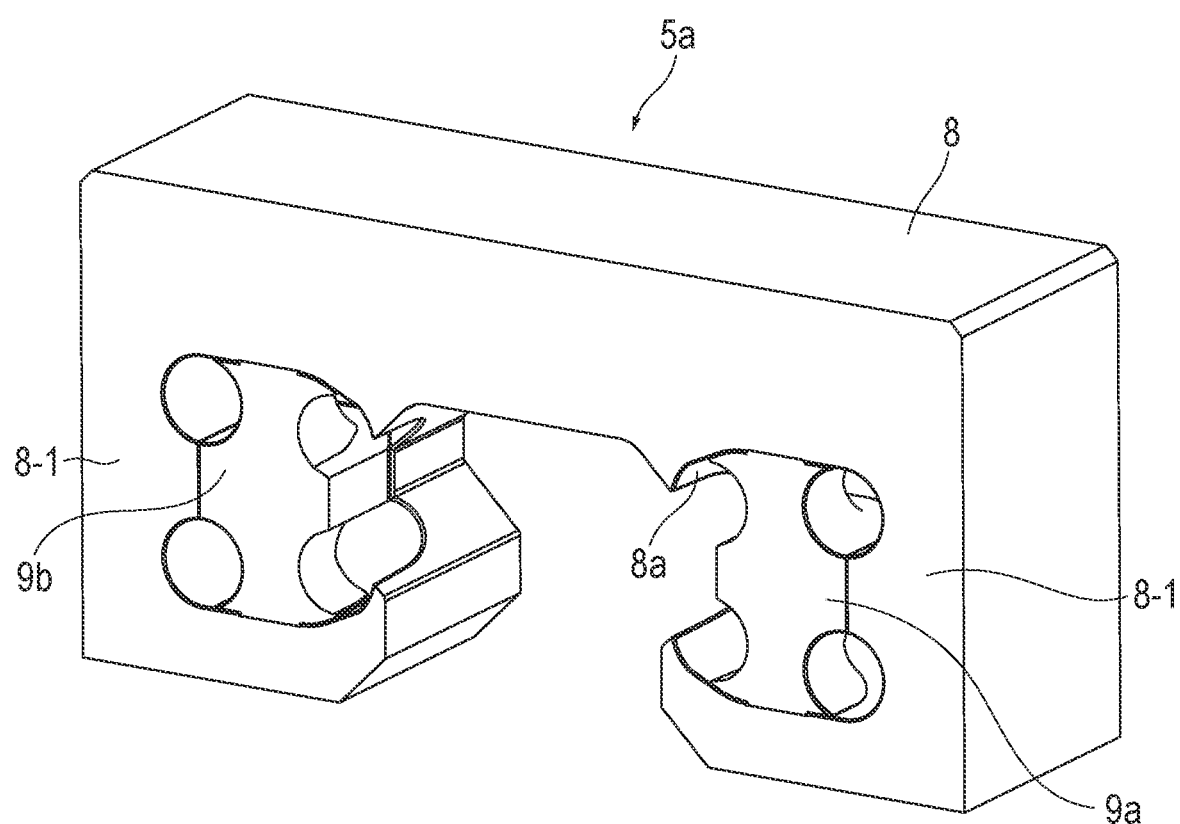
FIG. 4 is a perspective view of the lid member of the motion guide apparatus of the embodiment (as viewed in a different direction from that of FIG. 3).

FIGS. 3 and 4 illustrate perspective views of the lid member 5a as viewed from the block body 4 side. In FIGS. 3 and 4, the lid member 5a is viewed in different directions respectively to facilitate understanding. As illustrated in FIG. 3, four turn-around paths 13 are formed in the lid member 5a. A reference sign 13a denotes one end of each of the turn-around paths 13 connected to a respective loaded path 11. A reference sign 13b denotes the other end of the each of the turn-around paths 13 connected to a respective return path 12. The lid member 5a and the lid member 5b (refer to FIG. 1) have the same shape.

The lid member 5a includes a lid body 8 where the outer peripheral sides of the turn-around paths 13 are formed, and inner peripheral-side components 9a and 9b on each of which the inner peripheral sides of the turn-around paths 13 are formed. The lid body 8 has an inverted U shape in front view as in the block body 4 of the block 3. The inner peripheral-side components 9a and 9b are fitted into recesses of left and right sleeve portions 8-1 of the lid body 8, respectively.

Figure 5:
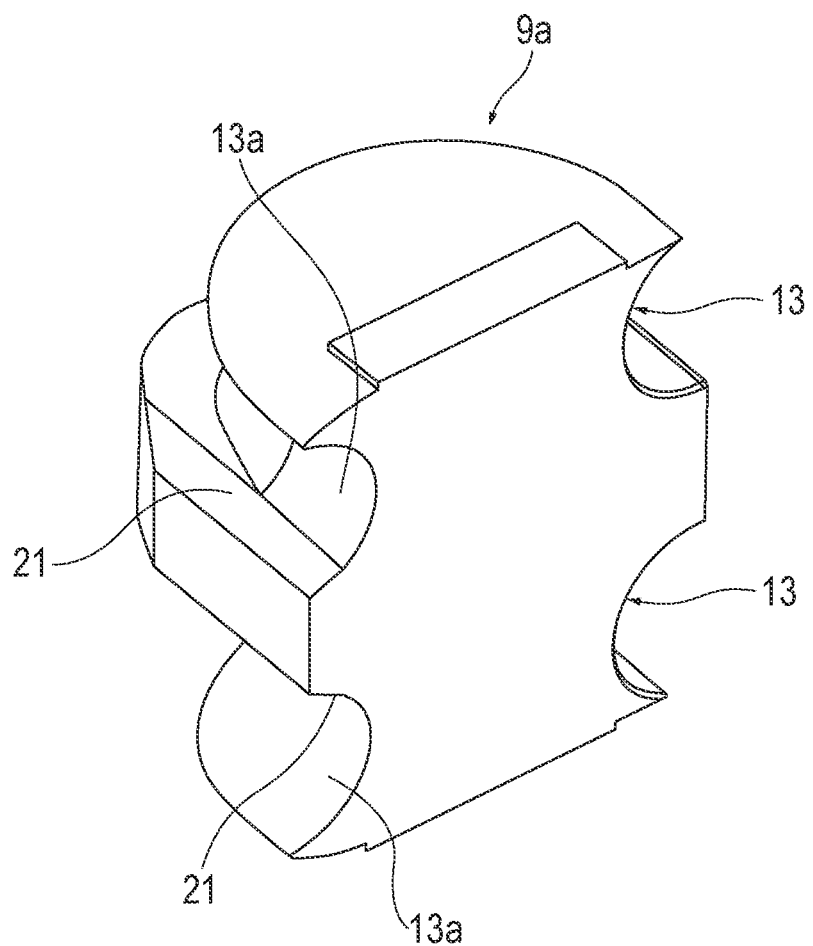
FIG. 5 is a perspective view of an inner peripheral-side component of the motion guide apparatus of the embodiment.

FIG. 5 illustrates a perspective view of the inner peripheral-side component 9a. The inner peripheral sides of two upper and lower turn-around paths 13 are formed on the inner peripheral-side component 9a. The inner peripheral side of each of the turn-around paths 13 is formed into an arc in cross section, and formed into an inverted U shape in its entirety. A rolling surface 21, which is a flat surface, is formed on a part (refer to FIG. 3(b)) near the ball rolling groove 2a at the end 13a on a loaded path 11 side of the upper turn-around path 13. The inner peripheral-side component 9a is horizontally symmetrical. The rolling surface 21 is formed also at the end 13a on a loaded path 11 side of the lower turn-around path 13. The inner peripheral-side component 9a and the inner peripheral-side component 9b (refer to FIG. 3(a)) are horizontally symmetrical with respect to each other. The rolling surfaces 21 are formed also on the inner peripheral-side component 9b as in the inner peripheral-side component 9a.

FIG. 3(b) is an enlarged view of a part b in FIG. 3(a). The reference sign 2 denotes a rail, the reference sign 2a denotes a ball rolling groove, the reference sign 8 denotes a lid body, the reference sign 9a denotes an inner peripheral-side component, and the reference sign 21 denotes a rolling surface. When the balls 7 enter the loaded path 11 from the turn-around path 13, the balls 7 transfer from the rolling surface 21 of the inner peripheral-side component 9a to the ball rolling groove 2a of the rail 2. On the other hand, when the balls 7 enter the turn-around path 13 from the loaded path 11, the balls 7 contact a contact portion 8a (refer also to FIG. 4) of the lid body 8, are guided toward the rolling surface 21 side by the contact portion 8a, and transfer from the ball rolling groove 2a to the rolling surface 21. The lid body 8 within the width of the ball rolling groove 2a may be provided with a wedge-shaped scooping portion that scoops the balls 7.

A reference sign 22 denotes an edge of the ball rolling groove 2a. The ball rolling groove 2a is formed up to the edge 22 into a concave curve surface in the form of an arc in cross section. A convex curve surface 23 in the form of an arc in cross section continuous with the edge 22 is formed outward of (in FIG. 3(b), below) the edge 22. An inclined surface 24 is formed outward of (in FIG. 3(b), below) the convex curve surface 23.

Figure 6:
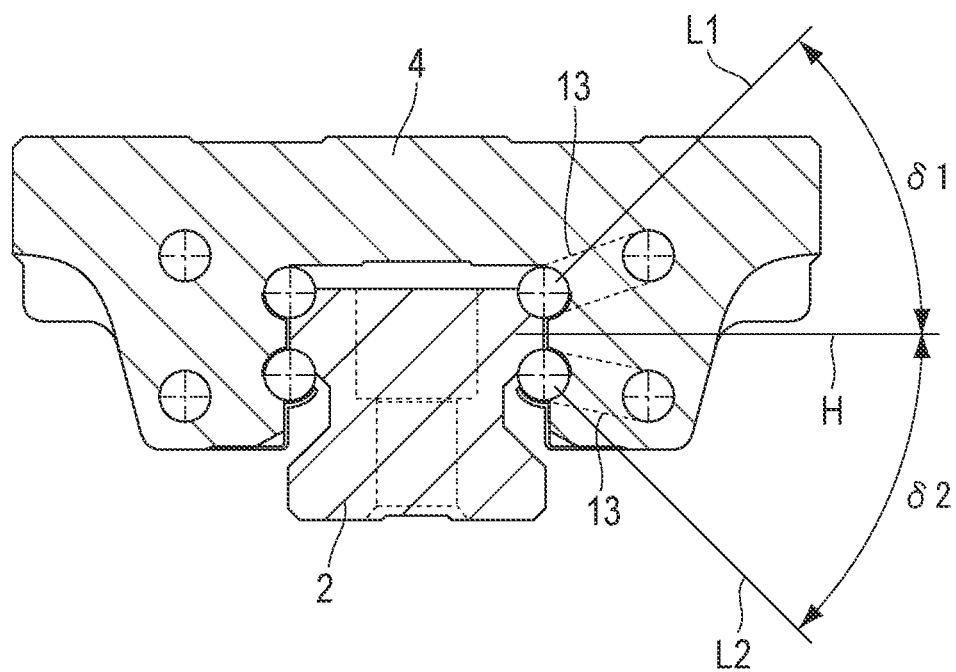
FIG. 6 is a diagram illustrating contact angle lines of the motion guide apparatus of the embodiment.

FIG. 6 is a diagram illustrating contact angle lines L1 and L2 of the motion guide apparatus 1 (a cross-sectional view of the rail 2 and the block body 4). The contact angle lines L1 and L2 represent directions in which the motion guide apparatus 1 can apply a load. Contact angles $\delta 1$ and $\delta 2$ are angles formed by the contact angle lines L1 and L2 and a horizontal line H. The contact angles $\delta 1$ and $\delta 2$ can be changed as appropriate in accordance with the use of the motion guide apparatus 1. The directions of the turn-around paths 13 are different from the directions of the contact angle lines L1 and L2 to reduce the dimensions of the block body 4 in the up-and-down direction. The directions of the contact angle lines L1 and L2 may be caused to agree with the directions of the turn-around paths 13.

Figure 7:
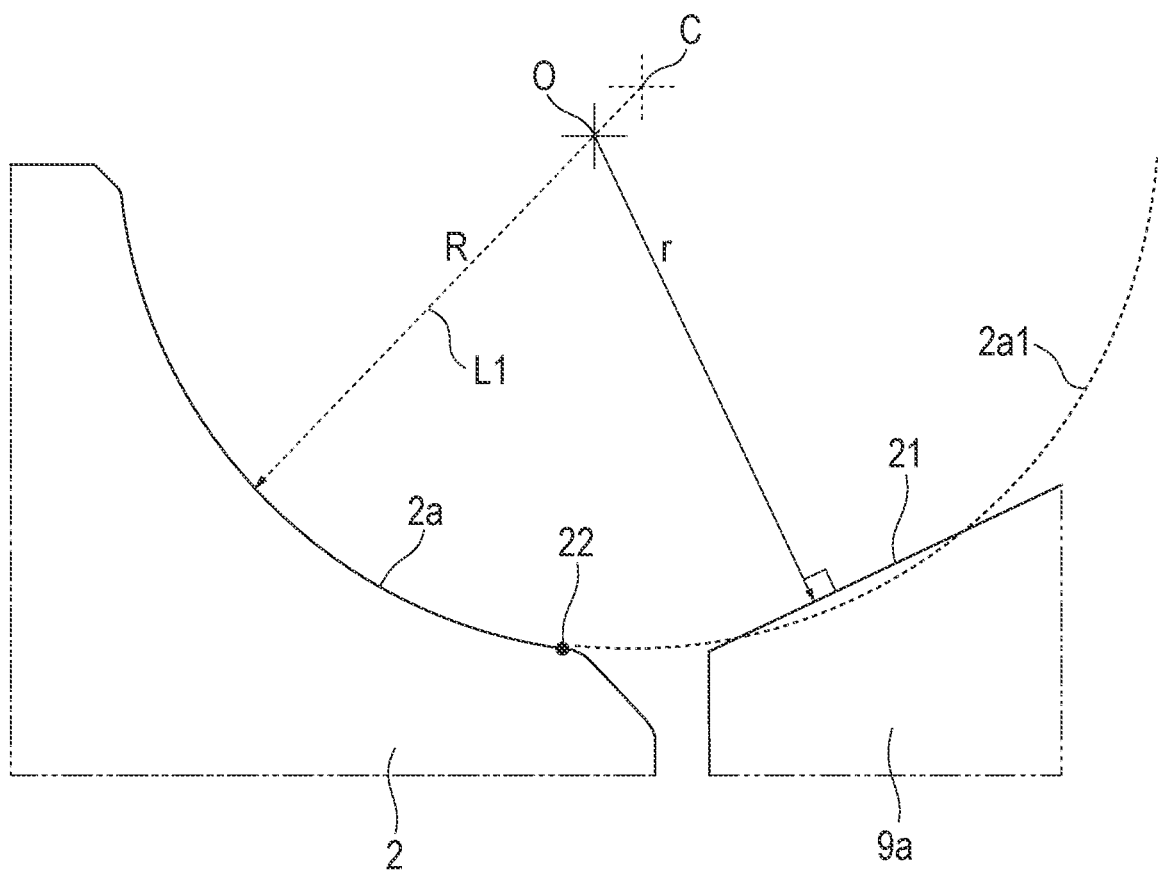
FIG. 7 is a cross-sectional view of the motion guide apparatus of the embodiment perpendicular to a length direction of a rail.

FIG. 7 illustrates a cross-sectional view of the motion guide apparatus 1 perpendicular to the length direction of the rail 2 (a cross-sectional view of the motion guide apparatus 1 along a boundary X (refer to FIG. 2) between the block body 4 and the lid member 5a). The reference sign 2 denotes a rail, the reference sign 2a denotes a ball rolling groove, the reference sign 9a denotes an inner peripheral-side component, and the reference sign 21 denotes a rolling surface.

Letting the radius of curvature of the ball rolling groove 2a be R, and letting the distance from a ball center O to the rolling surface 21 of the inner peripheral-side component 9a be r, R>r is set. R>r indicates that the rolling surface 21 is inward of an extension line 2a1 of the ball rolling groove 2a to prevent the balls from contacting the edge 22 of the ball rolling groove 2a.

Figure 8:
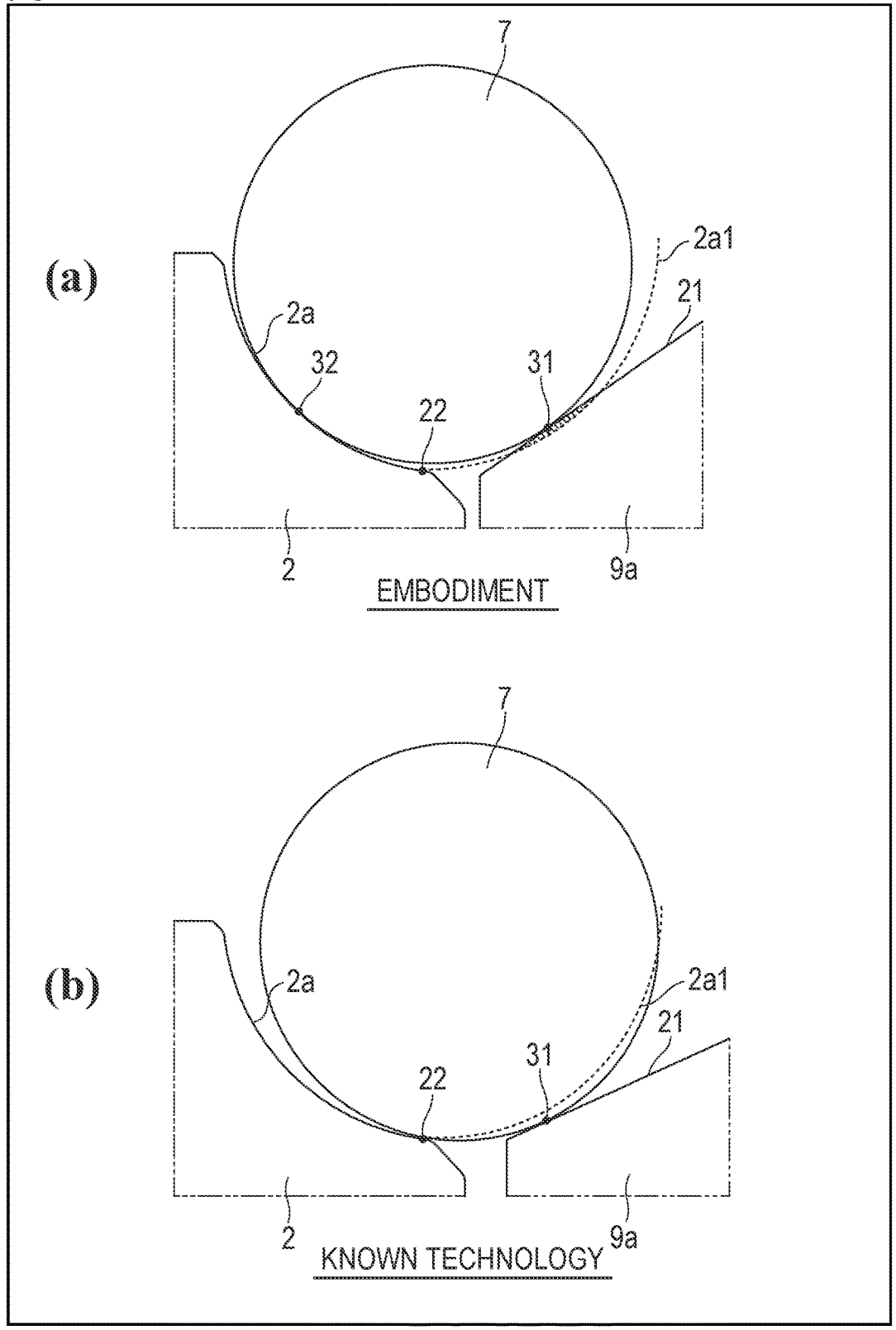
FIG. 8 is cross-sectional views of the motion guide apparatus perpendicular to the length direction of the rail (FIG. 8(a) illustrates the embodiment, and FIG. 8(b) illustrates a known technology).

FIG. 8(a) illustrates the embodiment where R>r is set, and FIG. 8(b) illustrates a known technology where R<r is set. In the known technology, R<r is set; therefore, the rolling surface 21 is outward of (in FIG. 8(b), below) the extension line 2a1 of the ball rolling groove 2a as illustrated in FIG. 8(b). Hence, when the ball 7 transfers from the rolling surface 21 to the ball rolling groove 2a, the ball 7 contacts the edge 22 of the ball rolling groove 2a. At this point in time, the ball 7 is supported at a contact point 31 of the rolling surface 21 and at the edge 22. On the other hand, in the embodiment, R>r is set; therefore, the rolling surface 21 is inward of the extension line 2a1 of the ball rolling groove 2a as illustrated in FIG. 8(a). The rolling surface 21 inward of the extension line 2a1 is represented by an oblique line. When the ball 7 transfers from the rolling surface 21 to the ball rolling groove 2a, the ball 7 is supported at the contact point 31 on the rolling surface 21 and at a contact point 32 on the ball rolling groove 2a. Therefore, it is possible to prevent the ball 7 from contacting the edge 22 of the ball rolling groove 2a.

As illustrated in FIG. 7, the ball center O is the center O of the ball 7 in contact with the ball rolling groove 2a under no-load conditions, and is on the contact angle line L1. The radius of curvature R of the ball rolling groove 2a is set at 51 to 53% of the diameter of the ball 7 in many cases. Therefore, the center of curvature C of the ball rolling groove 2a is slightly displaced from the ball center O. FIG. 7 exaggeratedly illustrates the displacement.

Figure 9:
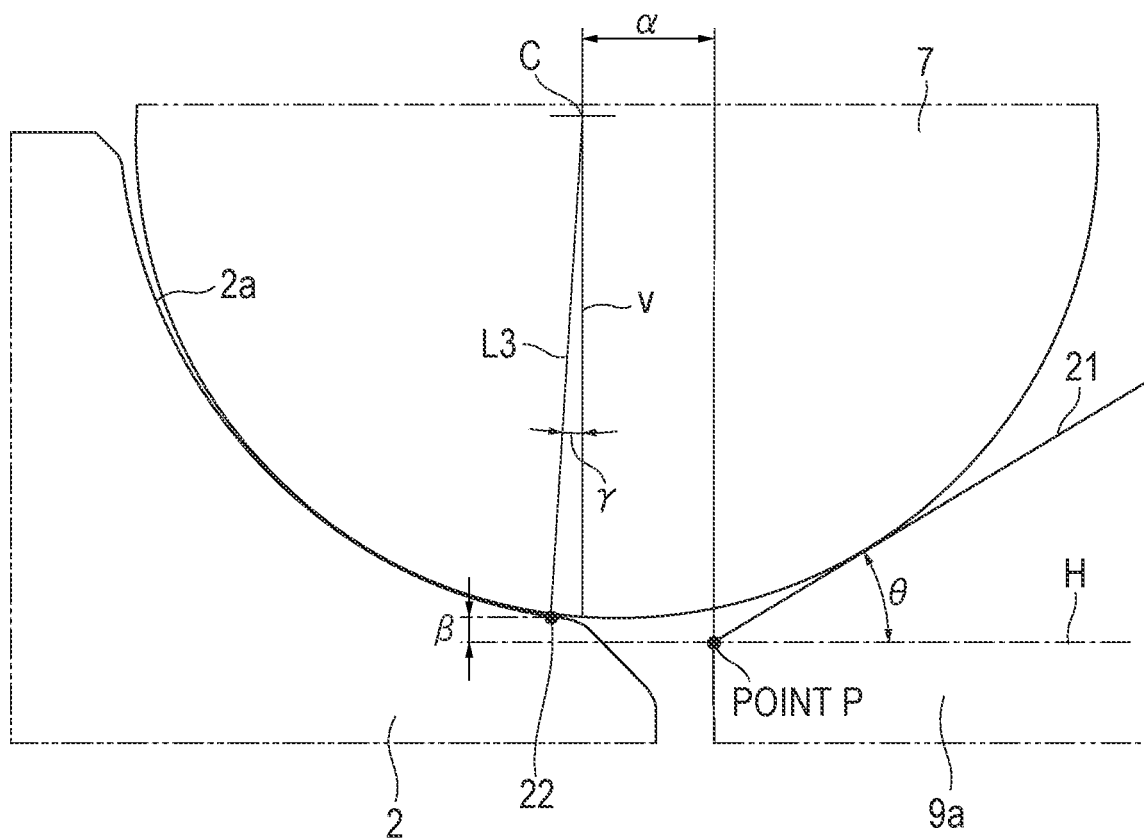
FIG. 9 is a cross-sectional view of the motion guide apparatus of the embodiment perpendicular to the length direction of the rail.

FIG. 9 illustrates a cross-sectional view of the motion guide apparatus 1 perpendicular to the length direction of the rail 2 as in FIG. 7. The reference sign 2 denotes a rail, the reference sign 2a denotes a ball rolling groove, the reference sign 9a denotes an inner peripheral-side component, and the reference sign 21 denotes a rolling surface.

On a basis of the satisfaction of the above condition, R>r, letting the angle formed by a straight line L3 linking the center of curvature C of the ball rolling groove 2a and the edge 22 of the ball rolling groove 2a, and a vertical line V be $\gamma$, and letting the angle formed by the rolling surface 21 of the inner peripheral-side component 9a and the horizontal line H be $\theta$, $\theta > \gamma$ is set to ensure clearance between the ball 7 at a nominal position and the rolling surface 21. The inner peripheral-side component 9a is a resin molded product in many cases. Accordingly, a dimension error occurs unavoidably. $\theta > \gamma$ is set to ensure the clearance. As a result, it is possible to tolerate the dimension error of the inner peripheral-side component 9a.

This is described in detail. FIG. 9 illustrates a state where the ball 7 has moved near the edge 22 of the ball rolling groove 2a from the nominal position while in contact with the ball rolling groove 2a. The nominal position is a position when the ball center O is on the contact angle line L1 (refer to FIG. 7). If R>r is set, the ball 7 contacts the rolling surface 21 before moving to the edge 22 of the ball rolling groove 2a (to the right in FIG. 9) from the nominal position as illustrated in FIG. 9. Conversely, if the ball 7 moves to the nominal position (to the left in FIG. 9) back from the edge 22 of the ball rolling groove 2a, clearance is created between the ball 7 and the rolling surface 21. $\theta > \gamma$ is set to increase the angle of $\theta$. This is to ensure the clearance.

In contrast, if $\theta < \gamma$ is set (the rolling surface 21 is made horizontal or substantially horizontal), even when the ball 7 moves to the nominal position (to the left in FIG. 9) back from the edge 22 of the ball rolling groove 2a, the clearance between the ball 7 and the rolling surface 21 cannot be ensured. This is because, if the rolling surface 21 is made horizontal or substantially horizontal, the rolling surface 21 is near the lowest point of the ball 7; therefore, even when the ball 7 moves to the left in FIG. 9, the clearance is almost unchanged. In this case, if a dimension error occurs in the inner peripheral-side component 9a, the ball 7 may interfere with the rolling surface 21 to prevent the ball 7 from circulating.

Up to this point the configuration of the embodiment has been described. However, the present invention is not limited to the realization of the embodiment, and can be realized in other embodiments within the scope where the gist of the present invention is not changed. For example, in the embodiment, the inner peripheral sides of the turn-around paths are formed on the inner peripheral-side component, but can also be formed in the lid body.

The description is based on Japanese Patent Application No. 2020-087900 filed on May 20, 2020, the entire contents of which are incorporated herein.

REFERENCE SIGNS LIST

1 Motion guide apparatus
2 Rail (track member)
2a Ball rolling groove
3 Block (moving member)
4 Block body (moving member body)
4a Loaded ball rolling groove
5a, 5b Lid member
7 Ball
8 Lid body
9a, 9b Inner peripheral-side component (inner peripheral side of turn-around path)
11 Loaded path
12 Return path
13 Turn-around path
21 Rolling surface
22 Edge of ball rolling groove
O Ball center
C Center of curvature of ball rolling groove
L3 Straight line linking center of curvature of ball rolling groove and edge of ball rolling groove
V Vertical line
H Horizontal line

The invention claimed is:

1. A motion guide apparatus comprising:
a track member including a ball rolling groove; and
a moving member assembled to the track member in such a manner as to be movable relative to the track member, the moving member including:
a moving member body having a loaded ball rolling groove facing the ball rolling groove, and a return path substantially parallel to the loaded ball rolling groove; and
a lid member having a turn-around path connected to a loaded path between the ball rolling groove and the loaded ball rolling groove and to the return path,
the loaded path, the return path, and the turn-around path configuring a circulation path where a plurality of balls is arranged, wherein
in cross section of the motion guide apparatus perpendicular to a length direction of the track member,
letting the radius of curvature of the ball rolling groove be R, and letting the distance from a ball center to a rolling surface of the inner peripheral side of the turn-around path be r, R>r is set.

2. The motion guide apparatus according to claim 1, wherein letting the angle formed by a straight line linking the center of curvature of the ball rolling groove and an edge of the ball rolling groove, and a vertical line be γ, and letting the angle formed by the rolling surface and a horizontal line be θ, θ>γ is set.

3. The motion guide apparatus according to claim 1, wherein
the lid member includes: a lid body where the outer peripheral side of the turn-around path is formed; and an inner peripheral-side component where the inner peripheral side of the turn-around path is formed, and
the rolling surface of the inner peripheral side of the turn-around path is formed on the inner peripheral-side component.

4. The motion guide apparatus according to claim 2, wherein
the lid member includes: a lid body where the outer peripheral side of the turn-around path is formed; and an inner peripheral-side component where the inner peripheral side of the turn-around path is formed, and
the rolling surface of the inner peripheral side of the turn-around path is formed on the inner peripheral-side component.

\* \* \* \* \*